United States Patent
Regmi

(10) Patent No.: US 10,504,367 B2
(45) Date of Patent: Dec. 10, 2019

(54) NAVIGATION ASSISTED COLLISION AVOIDANCE AT INTERSECTIONS

(71) Applicant: Ford Global Technologies, LLC, Dearborn, MI (US)

(72) Inventor: Sagar Kumar Regmi, San Jose, CA (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 33 days.

(21) Appl. No.: 15/495,779

(22) Filed: Apr. 24, 2017

(65) Prior Publication Data
US 2018/0308360 A1    Oct. 25, 2018

(51) Int. Cl.
G08G 1/16       (2006.01)
G08G 1/0965     (2006.01)

(52) U.S. Cl.
CPC ........... G08G 1/162 (2013.01); G08G 1/0965 (2013.01); G08G 1/166 (2013.01)

(58) Field of Classification Search
CPC ....... G08G 1/162; G08G 1/0965; G08G 1/166
USPC ........................................................ 701/117
See application file for complete search history.

(56) References Cited

U.S. PATENT DOCUMENTS

| | | | |
|---|---|---|---|
| 6,624,782 B2 | 9/2003 | Jocoy et al. | |
| 7,302,325 B2 | 11/2007 | Kudo | |
| 8,587,418 B2 | 11/2013 | Mochizuki et al. | |
| 8,610,595 B1 | 12/2013 | Aleteeby | |
| 8,810,431 B2 | 8/2014 | Mudalige et al. | |
| 9,020,728 B2 | 4/2015 | Goudy et al. | |
| 9,147,353 B1* | 9/2015 | Slusar .................. | G09B 19/167 |
| 9,959,764 B1* | 5/2018 | Binion ................ | G06F 17/5095 |
| 10,008,111 B1* | 6/2018 | Grant .................... | G08G 1/0965 |
| 10,176,524 B1* | 1/2019 | Brandmaier ........... | G06Q 40/08 |
| 10,185,999 B1* | 1/2019 | Konrardy ............... | G07C 5/008 |
| 2012/0025965 A1* | 2/2012 | Mochizuki ............. | B60Q 9/008 |
| | | | 340/435 |
| 2013/0116915 A1* | 5/2013 | Ferreira ................. | G08G 1/163 |
| | | | 701/117 |
| 2014/0091920 A1* | 4/2014 | Thompson ............... | B60Q 1/38 |
| | | | 340/475 |
| 2015/0032362 A1* | 1/2015 | Goudy ................... | G08G 1/166 |
| | | | 701/301 |
| 2015/0124096 A1* | 5/2015 | Koravadi ........... | G06K 9/00825 |
| | | | 348/148 |
| 2015/0254977 A1* | 9/2015 | Grabow ............... | G08G 1/0141 |
| | | | 340/903 |
| 2015/0266421 A1* | 9/2015 | Brubaker ................. | B60R 1/00 |
| | | | 348/148 |
| 2016/0167579 A1* | 6/2016 | Hwang .................. | G08G 1/163 |
| | | | 340/435 |
| 2017/0113683 A1* | 4/2017 | Mudalige .............. | B60W 30/08 |

(Continued)

Primary Examiner — Tuan C To
(74) Attorney, Agent, or Firm — David R. Stevens; Stevens Law Group

(57) ABSTRACT

According to one embodiment, a vehicle may include a turn signal status component, communication component, and a maneuver component. The turn signal status component detects an active turn signal indicator on a target vehicle. The communication component receives a wireless communication indicating an intended turning maneuver of the target vehicle. The maneuver component determines a maneuver for the parent vehicle or a timing for the maneuver based at least in-part on the intended turning maneuver.

20 Claims, 7 Drawing Sheets

(56) References Cited

U.S. PATENT DOCUMENTS

2017/0131719 A1* 5/2017 Micks .................. B60W 40/08
2017/0178498 A1* 6/2017 Mcerlean ............... B60K 35/00
2017/0190334 A1* 7/2017 Zelman ................. B60W 40/09
2017/0193384 A1* 7/2017 Mudalige .......... B60W 50/0097

* cited by examiner

NAVIGATION ASSISTED COLLISION AVOIDANCE AT INTERSECTIONS

TECHNICAL FIELD

The disclosure relates generally to methods, systems, and apparatuses for avoiding collisions at intersections or during turns and more particularly relates to methods, systems, and apparatuses for avoiding collisions at intersections based assistance from a navigation system.

BACKGROUND

Automobiles provide a significant portion of transportation for commercial, government, and private entities. Autonomous vehicles and driving assistance systems are currently being developed and deployed to provide safety, reduce an amount of user input required, or even eliminate user involvement entirely. For example, some driving assistance systems, such as crash avoidance systems, may monitor driving, positions, and a velocity of the vehicle and other objects while a human is driving. When the system detects that a crash or impact is imminent the crash avoidance system may intervene and apply a brake, steer the vehicle, or perform other avoidance or safety maneuvers. As another example, autonomous vehicles may drive and navigate a vehicle with little or no user input. Collisions between vehicles often occur at intersections or during a turning maneuver of a vehicle or nearby vehicle.

BRIEF DESCRIPTION OF THE DRAWINGS

Non-limiting and non-exhaustive implementations of the present disclosure are described with reference to the following figures, wherein like reference numerals refer to like parts throughout the various views unless otherwise specified. Advantages of the present disclosure will become better understood with regard to the following description and accompanying drawings where.

DETAILED DESCRIPTION

The present disclosure is directed to driving assistance or driving control for navigating a turn or intersection. According to data, there are thousands of crashes and injuries during left turn or U-turn. Embodiments disclosed herein may help to mitigate the risk factor in U-turn and left turn movement in an intersection.

According to one embodiment, a vehicle may include a turn signal status component, communication component, and a maneuver component. The turn signal status component detects an active turn signal indicator on a target vehicle. The communication component receives a wireless communication, such as a V2V message, indicating an intended turning maneuver of the target vehicle. The maneuver component determines a maneuver for the parent vehicle or a timing for the maneuver based at least in-part on the intended turning maneuver.

In at least one embodiment, a vehicle control system or navigation system may determine that a turn signal indicator of a parent vehicle is active. Based on an active route of a navigation system of a parent vehicle, the vehicle control system or navigation system determines an intended turning maneuver. If the turn signal is active, the vehicle control system or navigation system transmits a message indicating the intended turning maneuver for receipt by proximal vehicles.

Further embodiments and examples will be discussed in relation to the figures below. Descriptions of turns and maneuvers are provided with respect to right-hand traffic by way of example only. However, embodiments and teaching herein are also applicable to left-hand traffic. One of skill in the art will be able to apply the teaching provided herein with respect to left-hand traffic in light of the present disclosure.

Figure 1:
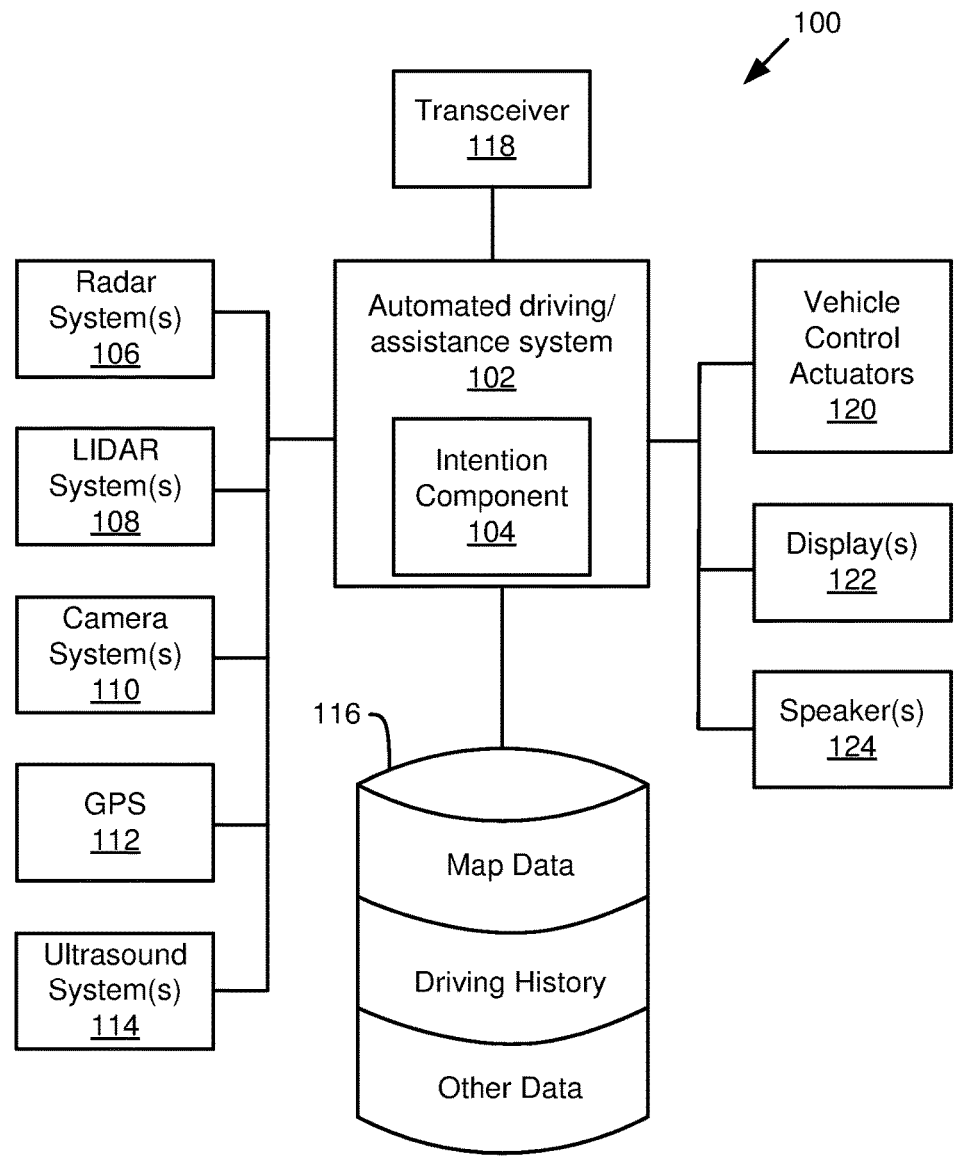
FIG. 1 is a schematic block diagram illustrating an implementation of a vehicle control system that includes an automated driving/assistance system.

Referring now to the figures, FIG. 1 illustrates an example vehicle control system 100 that may be used to automatically localize a vehicle. The automated driving/assistance system 102 may be used to automate or control operation of a vehicle or to provide assistance to a human driver. For example, the automated driving/assistance system 102 may control one or more of braking, steering, acceleration, lights, alerts, driver notifications, radio, or any other auxiliary systems of the vehicle. In another example, the automated driving/assistance system 102 may not be able to provide any control of the driving (e.g., steering, acceleration, or braking), but may provide notifications and alerts to assist a human driver in driving safely. The automated driving/assistance system 102 may use a neural network, or other model or algorithm to detect or localize objects based on perception data gathered by one or more sensors.

The vehicle control system 100 also includes one or more sensor systems/devices for detecting a presence of objects near or within a sensor range of a parent vehicle (e.g., a vehicle that includes the vehicle control system 100). For example, the vehicle control system 100 may include one or more radar systems 106, one or more LIDAR systems 108, one or more camera systems 110, a global positioning system (GPS) 112, and/or one or more ultrasound systems 114. The vehicle control system 100 may include a data store 116 for storing relevant or useful data for navigation and safety such as map data, driving history or other data. The vehicle control system 100 may also include a transceiver 118 for wireless communication, such as for V2V communication, with a mobile or wireless network, other vehicles, infrastructure, or any other communication system.

The vehicle control system 100 may include vehicle control actuators 120 to control various aspects of the driving of the vehicle such as electric motors, switches or other actuators, to control braking, acceleration, steering or the like. The vehicle control system 100 may also include one or more displays 122, speakers 124, or other devices so that notifications to a human driver or passenger may be provided. A display 122 may include a heads-up display, dashboard display or indicator, a display screen, or any other visual indicator which may be seen by a driver or passenger of a vehicle. The speakers 124 may include one or more speakers of a sound system of a vehicle or may include a speaker dedicated to driver notification.

It will be appreciated that the embodiment of FIG. 1 is given by way of example only. Other embodiments may include fewer or additional components without departing from the scope of the disclosure. Additionally, illustrated components may be combined or included within other components without limitation.

In one embodiment, the automated driving/assistance system 102 is configured to control driving or navigation of a parent vehicle. For example, the automated driving/assistance system 102 may control the vehicle control actuators 120 to drive a path on a road, parking lot, driveway or other location. For example, the automated driving/assistance system 102 may determine a path based on information or perception data provided by any of the components 106-118. The sensor systems/devices 106-110 and 114 may be used to obtain real-time sensor data so that the automated driving/assistance system 102 can assist a driver or drive a vehicle in real-time.

In one embodiment, the vehicle control system 100 includes an intention component 104 for assisting or driving the vehicle through an intersection or in the presence of other turning vehicles. The intention component 104 may detect an intended turning location or driving maneuver of another system. For example, the intention component 104 may receive a vehicle-to-vehicle (V2V) communication that indicates a roadway, direction, turning maneuver, or other information to specifically indicate where the transmitting vehicle is intended to drive. In one embodiment, the intention component 104 may cause a vehicle to request information or receive and processes messages about an intended driving maneuver in response to detecting an active turn signal.

The intention component 104 may also operate to provide notifications of an intended turn or driving maneuver. In one embodiment, the intention component 104 determines an intended driving maneuver based on an active route of a navigation system, such as a route that was requested or is currently being followed by a human driver or a vehicle control system. In one embodiment, the intention component 104 may cause a parent vehicle to transmit a message to proximal vehicles informing them of the intended turning location or maneuver. For example, the message may be sent in response to a turn signal being activated on the parent vehicle.

Figure 2:
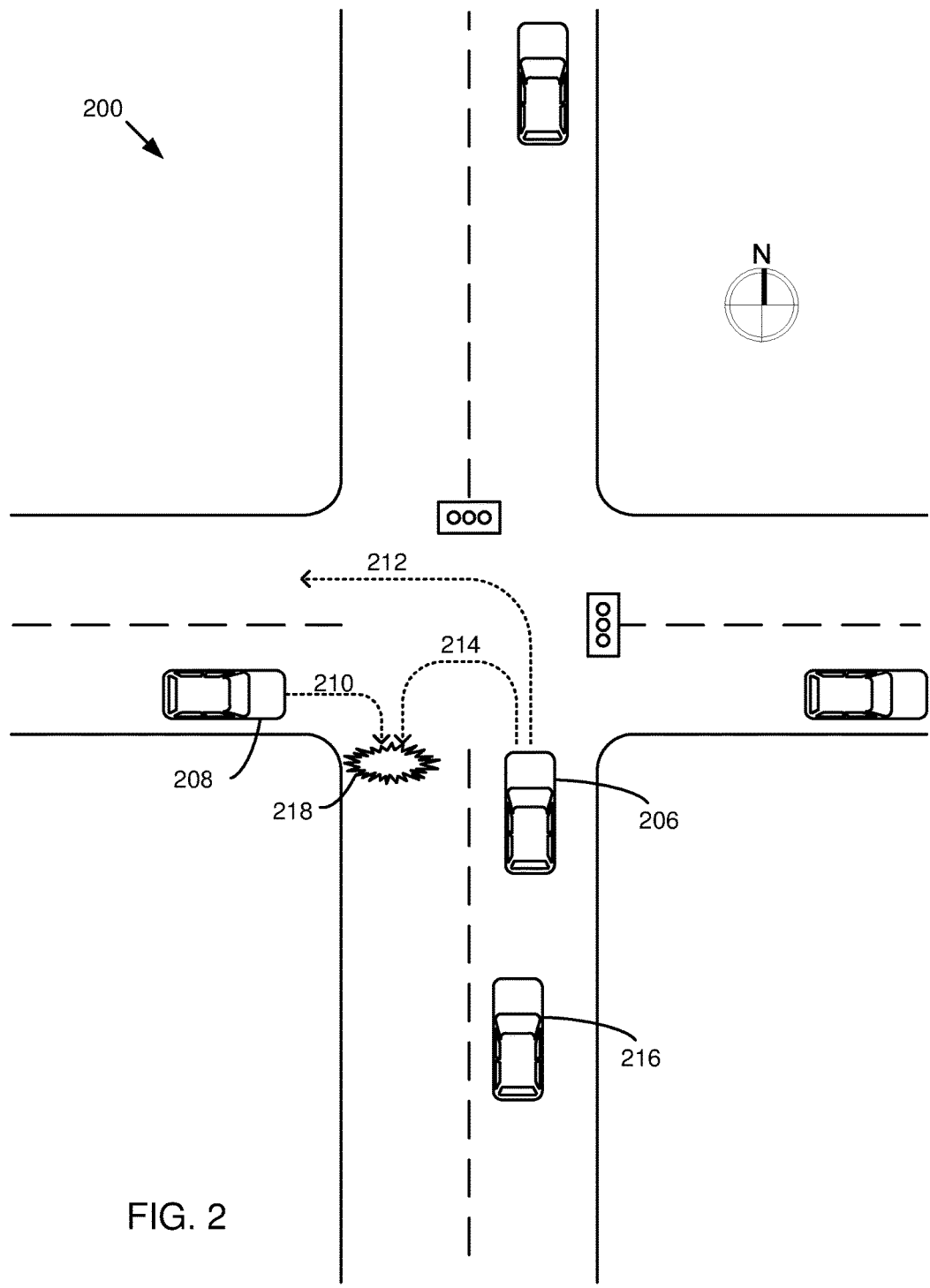
FIG. 2 illustrates a map view showing vehicles in or near an intersection, according to one scenario.
Figure 3:
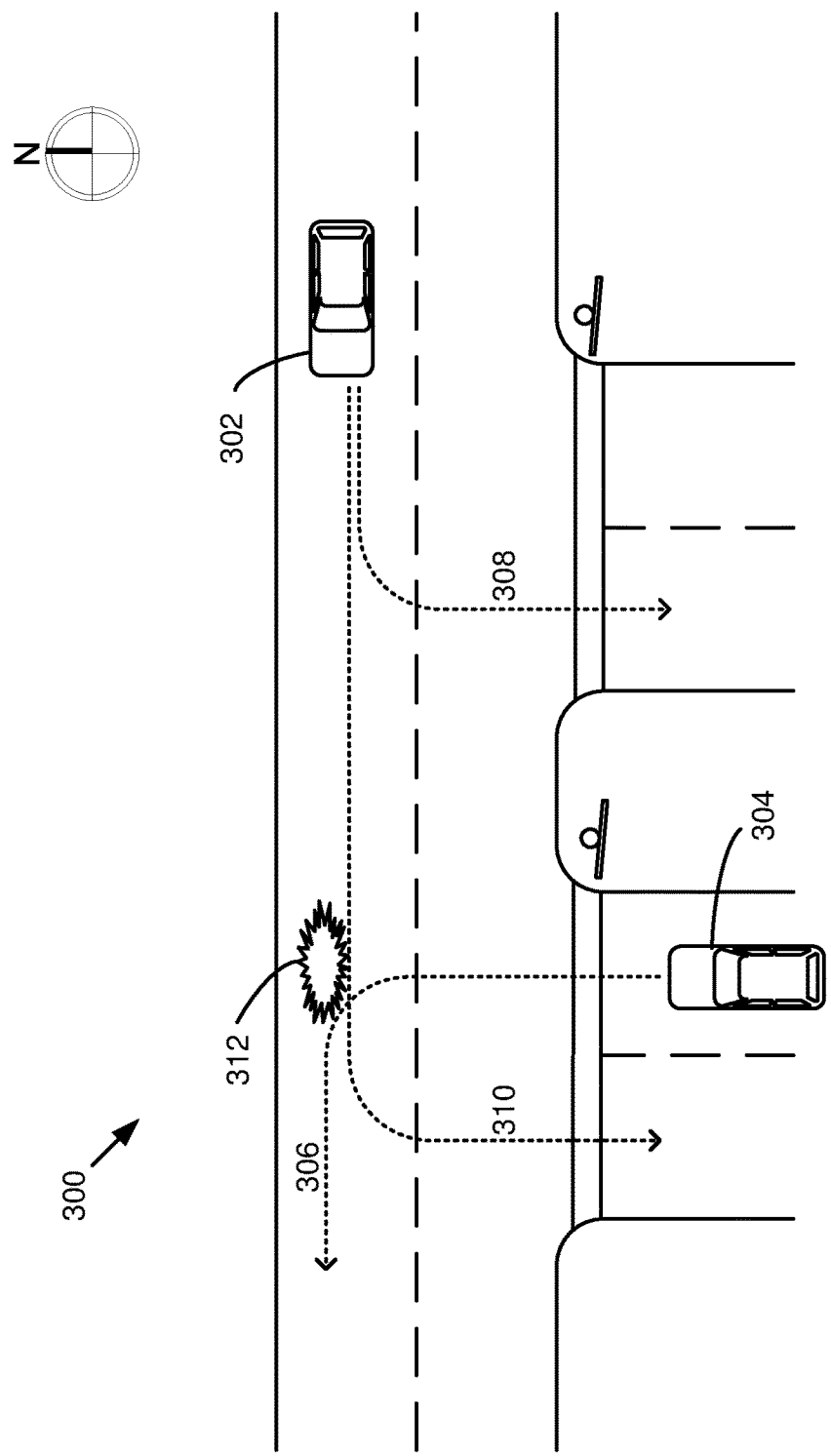
FIG. 3 illustrates a map view showing vehicles in or near a plurality of intersections, according to one scenario.
Figure 4:
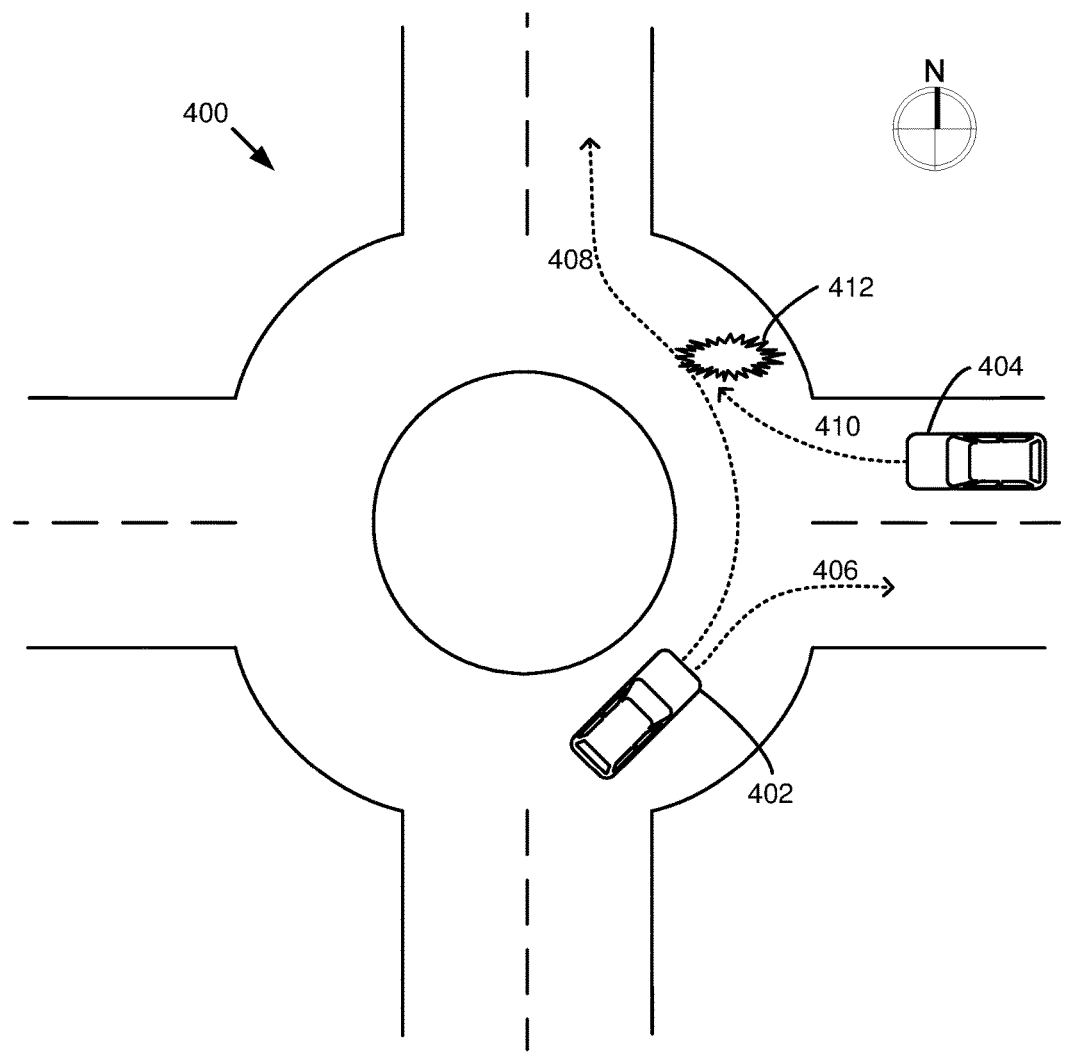
FIG. 4 illustrates a map view showing vehicles in or near a traffic circle, according to one scenario.

FIGS. 2-4 illustrate example driving scenarios where there are risks of collisions at intersections and where a turn signal may present an ambiguous meaning to nearby vehicles. FIG. 2 is a map view illustrating vehicles in or near an intersection 200 between a first road (in north/south direction) and a second road (in an east/west direction). A first vehicle 206 is in a left-most lane of the first road in northbound traffic with a left-turn signal activated (e.g., blinking). A second vehicle 208 is approaching the intersection on the second road in an eastbound direction and is attempting to make a right-hand turn south along the path 210. If the traffic signal for eastbound traffic is red, the second vehicle 208 may make the right hand-turn after yielding to northbound or southbound traffic. If the traffic signal for northbound traffic (and/or for a left turn) is green, the first vehicle 206 may either turn left along the path 212 to head westbound or perform a U-turn along the path 214 to head southbound. The first vehicle 206 may need to make a wide-angle turn depending on the size of the vehicle and also it may slow down a bit while making the U-turn. The second vehicle 208 may assume (inaccurately or accurately) that the first vehicle 206 is trying to make a left turn and not a U-turn based on its position and/or the active left turn signal. If the second vehicle happens to make the right turn along path 210 at the same time as the first vehicle 206 is making U-turn along path 214, there may be a chance of collision at 218 as both vehicles might end up in same southbound lane of the first road.

Similarly, a third vehicle 216 located behind and/or in a same lane as the first vehicle 206 may also be at risk of collision. For example, if the third vehicle 216 assumes the first vehicle 206 is turning left, the third vehicle 216 or its driver may not be ready when the first vehicle slows to perform a U-turn. In some cases, a U-turn is performed more slowly than a left turn. Thus, the third vehicle 216 may be at risk of collision with the rear end of the first vehicle 206.

FIG. 3 is a map view illustrating vehicles in or near a roadway with intersections 300 with multiple other roads. A first vehicle 302 is shown westbound on first road (in the east/west direction). A second vehicle 304 is shown approaching the first road from the south on a second road and is attempting to make a left-hand turn onto the first road along the path 306. A third road also intersects the first road from the south. The first vehicle 302 may have an active blinker to indicate an intention to turn left. However, due to the presence of the two adjoining roadways, it may be unclear to the second vehicle 304, or a driver of the second vehicle 304, whether the first vehicle will take a left turn along path 308 to turn southbound on the third road or will turn left along the path 310. For example, if the first vehicle 302 activates a left turn signal in advance of the third road, the second vehicle 304 may interpret the active turn signal as indicating a turn onto the third roadway along the path 308. If the second vehicle 304 is incorrect and proceeds along the path 306 while the first vehicle proceeds along the path 310, the second vehicle 304 and the first vehicle 302 may be at risk of collision at 312.

FIG. 4 is a map view illustrating vehicles in or near a first roadway (in the north/south direction) and a second roadway (in the east/west direction) intersecting at a traffic circle 400 (or roundabout). A first vehicle 402 has already entered the traffic circle 400. A second vehicle 404 is approaching the traffic circle from the east. As the second vehicle 404 approaches the traffic circle 400 it may be difficult to determine whether the first vehicle 402 is going to turn east along the path 406 or continue around the traffic circle 400 to head north along the path 408. If the second vehicle 404 incorrectly assumes that the first vehicle 402 is going to turn right along the path 406 and proceeds into the traffic circle along the path 410, there is a risk of collision at 412. For example, the first vehicle 402 may or may not have a turn signal activated which may cause the second vehicle 404, or a driver of the second vehicle, to believe that the first vehicle is following the path 406.

In each of the scenarios discussed in relation to FIGS. 2-4, vehicles at or near an intersection with an active turn signal may present an ambiguity to other drivers or vehicle control systems. In one embodiment, one or more vehicles may be equipped with an intention component 104, as discussed in FIG. 1. If the intention component 104 is in a vehicle approaching an intersection, the intention component 104 may detect an active turn signal indicator on a target vehicle, such as a vehicle near a parent vehicle in which the intention component 104 is located. The intention component 104 may receive a wireless communication, such as a V2V message, indicating an intended turning maneuver of the target vehicle. The intention component 104 or parent vehicle may determine a maneuver for the parent vehicle or a timing for the maneuver based at least in-part on the intended turning maneuver. For example, if the intended turning maneuver indicated that the target vehicle is going to perform a U-turn, turn on a specific road, or perform other maneuver, the parent vehicle may be able to determine a driving maneuver and proceed accordingly. If the parent vehicle is presented with an ambiguous driving situation, such as those depicted in FIGS. 2-4, the intention component 104 may cause a V2V message to be sent to request the intention of one or more nearby vehicles.

If the intention component 104 is in a vehicle with an active turn signal, the intention component 104 may determine, based on an active route of a navigation system of the parent vehicle, an intended turning maneuver. The intention component 104 may cause the parent vehicle to transmit a message indicating the intended turning maneuver for receipt by proximal vehicles. The intention component 104 may cause a V2V message to be sent in response to a request from a nearby vehicle and/or in response to the parent vehicle activating a turn signal.

Returning to FIG. 2, the first vehicle 206 may be equipped with a navigation system and V2X or V2V communication system. The navigation system may determine and provide route information of a current trip. In one embodiment, the second vehicle 208 may detect an active left-turn signal on the first vehicle 206 send a probe request or other message (via a V2V message) to the first vehicle 206 to understand the intent of left turn signal. The message may ask the first vehicle 206 to reply back to the second vehicle 208 with the intent of left turn signal, e.g. to turn left or to perform a U-turn. The second vehicle 208 may detect the first vehicle 206, and a state of its turn signal, using multiple sensor fusion like radar, LIDAR, camera, and/or V2V communications. The first vehicle 206 may reply back to the second vehicle 208 (or send a broadcast message) with the intent of making U-turn. The first vehicle 206 may know that it will make a U-turn or turn left based on route information from a navigation system.

The second vehicle 208, now knowing the intent of the first vehicle 206, can alert the driver or automated driving system of the second vehicle 208 with a warning. For example, visual, audible or haptic warnings may be provided to a human driver while an electrical signal or message may be provided to an automated driving system or assistance system. If it is known that the first vehicle 206 is turning left along path 212, the second vehicle 208 (or driver) may be able to proceed by making a safe right turn. If it is known that the first vehicle 206 is performing a U-turn, the second vehicle 208 may stop and wait to allow the first vehicle to perform a U-turn along the path 214 before proceeding to make the right turn.

Similarly, the third vehicle 216, after receiving a message indicating an intention for a turn signal of the first vehicle 206, may provide extra space for the first vehicle 206 to slow down and make a left turn or make a U-turn.

The first vehicle 206 may send messages about its intention response to requests or as broadcast messages. For example, every time a turn signal, such as a left turn signal, is activated, the first vehicle may send a broadcast V2V message that can be received by every other vehicle in or near the intersection. Each of the vehicles at the intersection may receive this message and perform actions accordingly.

In order to avoid processing unwanted messages, V2V software running in a recipient's vehicle may filter it out if it is not directly affected by the left turn signal. For example, each vehicle may determine whether there is a risk that its path will cross with the first vehicle 206. If there is a risk the receiving vehicle may receive and process the message indicating the intention of the first vehicle. Otherwise, the message may be ignored and remain unprocessed by the receiving vehicle.

Because both human driven and automated driving vehicles both may use navigation systems, both types of vehicles may operate as transmitters or receivers of messages that indicate an intention for a turn signal or driving maneuver.

Turning to FIG. 3, the first vehicle 302 may transmit a message indicating whether it intends to follow the path 308 or follow the path 310. If the message indicates path 308, the second vehicle 304 may proceed to turn onto the first road along path 306. If the message indicates path 310, the second vehicle 304 may wait for the first vehicle 302 to complete the turn before proceeding along the path 306.

With regard to FIG. 4, the first vehicle 402 may transmit a message indicating whether it intends to follow the path 406 or follow the path 408. If the message indicates path 406, the second vehicle 404 may proceed to enter the traffic circle along path 410. If the message indicates path 408, the second vehicle 404 may wait for the first vehicle 402 to proceed through the traffic circle 400 before proceeding along the path 410.

Figure 5:
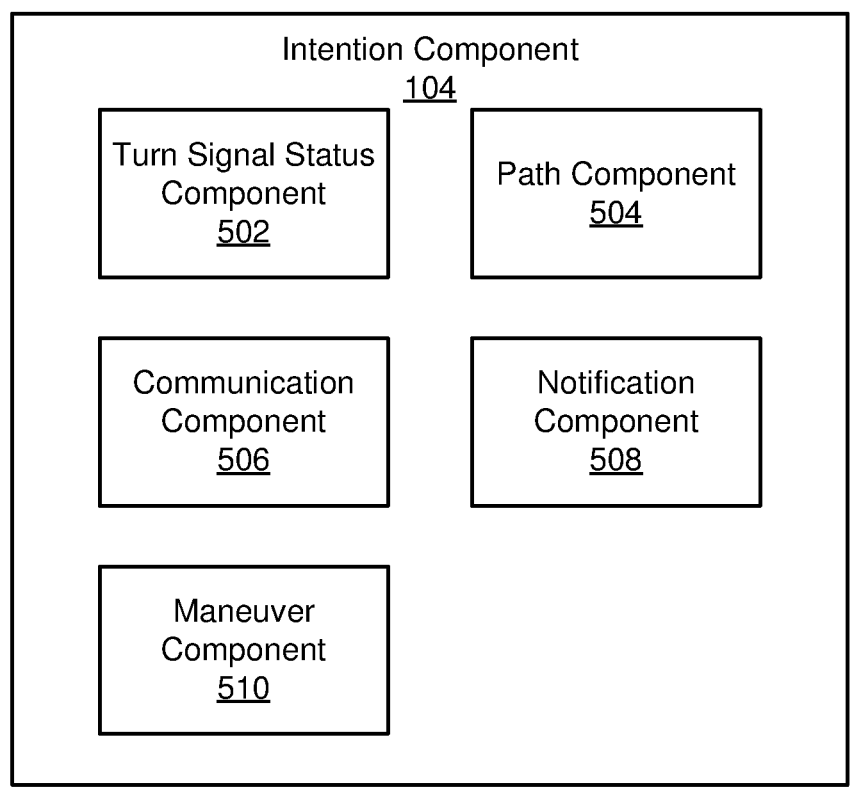
FIG. 5 is a schematic block diagram illustrating components of an intention component, according to one implementation.

FIG. 5 is a schematic block diagram illustrating components of an intention component 104, according to one embodiment. The intention component 104 may cause a vehicle to receive a notification of an intended turning location or to notify other vehicles of an intended turning location. The intention component 104 includes a turn signal status component 502, a path component 504, a communication component 506, a notification component 508, and a maneuver component 510. The components 502-510 are given by way of illustration only and may not all be included in all embodiments. In fact, some embodiments may include only one or any combination of two or more of the components 502-510. For example, some of the components may be located outside or separate from the intention component 104. Furthermore, the components 502-510 may comprise hardware, computer readable instructions, or a combination of both to perform the functionality and provide the structures discussed herein.

The turn signal status component 502 is configured to determine a status of a turn signal. In one embodiment, the turn signal status component 502 determines a turn status for a parent vehicle. For example, the turn signal status component 502 may determine whether a left or right turn signal of a parent vehicle has been activated. In one embodiment, the turn signal status component 502 determines a status of a turn signal on a different vehicle. For example, the turn signal status component 502 may process an image or other sensor data captured by a parent vehicle and detect whether a turn signal on a nearby target vehicle is active. The turn signal status component 502 may detect the active turn signal indicator based on an image or a series of images of the target vehicle. For example, the turn signal status component 502 may detect that a turn signal is in a lit or blinking state.

The path component 504 is configured to determine whether a path of a nearby vehicle is likely to cross or come near a path of a parent vehicle. The path component 504 may determine or predict one or more possible paths of a nearby vehicle based on a turn signal indicator state, a current velocity, direction of travel, and/or map information for nearby roadways or intersections. In one embodiment, the path component 504 may track and/or predict movement of the nearby vehicle based on radar, LIDAR, camera, ultrasound, or other data gathered by one or more sensors of a parent vehicle.

The path component 504 may also determine a planned path for the parent vehicle. For example, the path component 504 may determine what a current path is for the parent vehicle based on a route for a navigation system. The path component 504 may determine that the vehicle, or a driver, intends to turn at a specific intersection or perform some other driving maneuver. By comparing the path of the parent vehicle with one or more possible or likely paths of a nearby vehicle, the path component 504 may determine that there is a danger or likelihood of collision or intersection of driving paths. This information may mean that the intention of the nearby vehicle is relevant to decision making for the parent vehicle.

The communication component 506 is configured to perform V2V or V2X (vehicle to anything) communication. For example, the communication component 506 may include a radio or control unit for controlling a radio. The communications may include wireless communications that are sent directly between vehicles or messages that are sent indirectly such as via intermediary transmission nodes or networks. In one embodiment, the communication component 506 is configured to trigger the transmission of a message that indicates an intention of a parent vehicle. For example, if the parent vehicle is following a route that includes turning at an intersection, the communication component 506 may trigger a V2V of V2X message that informs one or more nearby vehicles of the desired turning location. This turning location may be obtained from a navigation system or a vehicle control system.

In one embodiment, the communication component 506 triggers the transmission of the parent vehicle's intention as part of a broadcast to all nearby vehicles or in response to a request from another vehicle. For example, the communication component 506 may receive a request for an intention tied to a turn signal of the parent vehicle and the communication component 506 may trigger a message in response to that request. As another example, the communication component 506 may trigger a broadcast to all nearby vehicles each time the parent vehicle enters an intersection or each time a turn-signal of the parent vehicle is activated. The intention may include one or more of a turn location, a type of turning maneuver, or any other indication of the intended maneuver. An example message which may be transmitted to other vehicles may include an indication of a location of one or more of an intersection, a roadway, driveway, or parking lot from a navigation system of the target vehicle. An example message which may be transmitted to other vehicles may include an indication of an intended U-turn maneuver. Another example message which may be transmitted to other vehicles may include an indication of an intended traffic circle exit location.

In one embodiment, the communication component 506 may trigger the sending of a message requesting the intention of a nearby vehicle. For example, the communication component 506 may request the intended turning maneuver from the target vehicle in response to the turn signal status component 502 detecting an active turn signal and/or the path component 504 determining that the driving path of the target vehicle will cross or pass within a predefined distance of a driving path of the parent vehicle.

The communication component 506 may receive messages about intended driving maneuvers or turn locations of other vehicles. For example, the communication component 506 may receive a message in response to requesting the intended driving maneuver or turn location of a vehicle. As another example, the communication component 506 may receive a message that has been broadcast to all nearby vehicles by a transmitting vehicle. The communication component 506 may determine whether to look for or process a received message based on whether the turn signal component 502 has detected an active turn signal and/or whether the path component has detected that the nearby vehicle may have a path that may lead to a collision with the parent vehicle.

The notification component 508 may provide a notification to a human driver or to an automated driving system or control system of a vehicle. For example, the notification component 508 may provide a visual, audio or haptic notification to a human driver that a nearby vehicle will be performing a U-turn. The notification component 508 may provide an electronic message to a vehicle control system or decision making system of the intended driving maneuver so that a well-informed driving decision can be made. The notification component 508 may send an indication of a recommended driving maneuver that has been determined by the maneuver component 510 to either a human driver or a control system.

The maneuver component 510 is configured to determine a maneuver for the parent vehicle or a timing for the maneuver based at least in-part on the intended turning maneuver received from a nearby vehicle. For example, the maneuver component 510 may determine a maneuver such as a collision avoidance maneuver including braking, turning, or accelerating to avoid a collision. As another example, the maneuver component 510 may determine a maneuver to avoid entering a driving path of a nearby vehicle within a time frame that might lead to a collision. In one embodiment, the maneuver component 510 may simply determine a time period to delay a maneuver, such as to delay proceeding through an intersection. In one embodiment, the maneuver component 510 may determine that no delay is needed and may allow the vehicle to proceed through an intersection or perform any other maneuver without delay or slowing.

Figure 6:
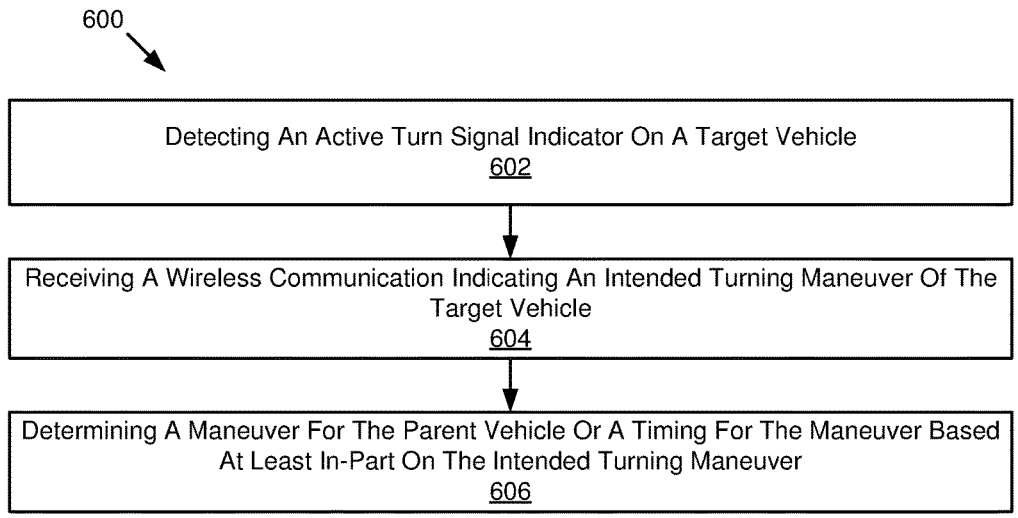
FIG. 6 is a schematic flow chart diagram illustrating a method for collision avoidance near intersections, according to one implementation.

FIG. 6 a schematic flow chart diagram illustrating a method 600 for collision avoidance based on an intention of a nearby vehicle. The method 600 may be performed by an intention component or vehicle control system such as the intention component 104 of FIG. 1 or 5 or the vehicle control system 100 of FIG. 1. The method 600 begins and a turn signal status component 502 detects 602 an active turn signal indicator on a target vehicle. A communication component 506 receives 604 a wireless communication indicating an intended turning maneuver of the target vehicle. A maneuver component 510 determines 606 a maneuver for the parent vehicle or a timing for the maneuver based at least in-part on the intended turning maneuver.

Figure 7:
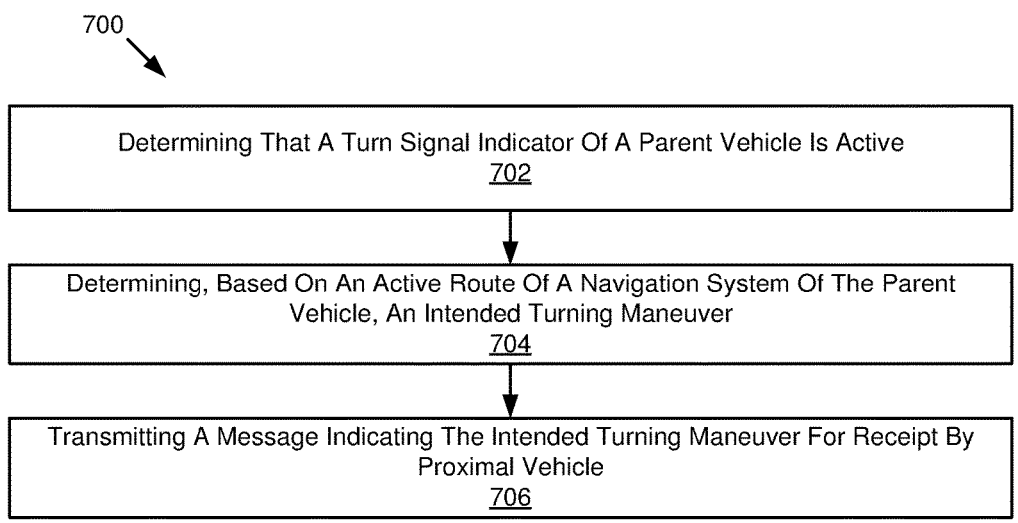
FIG. 7 is a schematic flow chart diagram illustrating another method for collision avoidance near intersections, according to one implementation.

FIG. 7 a schematic flow chart diagram illustrating a method 700 for collision avoidance by notifying nearby vehicles of a parent vehicles intended turning location or driving maneuver. The method 700 may be performed by an intention component or vehicle control system such as the intention component 104 of FIG. 1 or 5 or the vehicle control system 100 of FIG. 1. The method 700 begins and a turn signal status component 502 determines 702 that a turn signal indicator of a parent vehicle is active. A communication component 506 determines 704, based on an active route of a navigation system of the parent vehicle, an intended turning maneuver for the parent vehicle. The communication component 506 transmits 706 a message indicating the intended turning maneuver for receipt by proximal vehicle.

Figure 8:
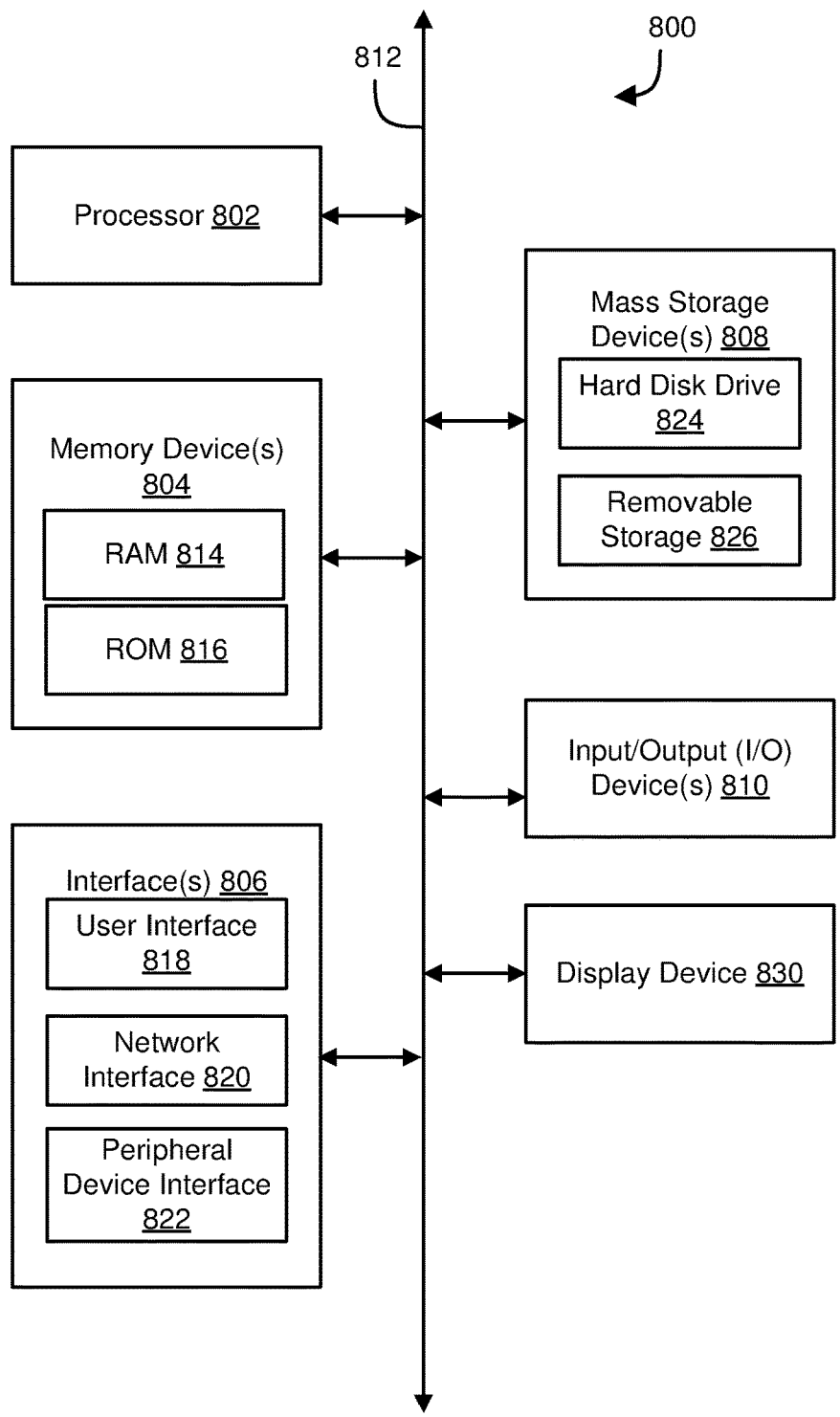
FIG. 8 is a schematic block diagram illustrating a computing system, according to one implementation.

Referring now to FIG. 8, a block diagram of an example computing device 800 is illustrated. Computing device 800 may be used to perform various procedures, such as those discussed herein. In one embodiment, the computing device 800 can function as an intention component 104, automated driving/assistance system 102, vehicle control system 100, or the like. Computing device 800 can perform various monitoring functions as discussed herein, and can execute one or more application programs, such as the application programs or functionality described herein. Computing device 800 can be any of a wide variety of computing devices, such as a desktop computer, in-dash computer, vehicle control system, a notebook computer, a server computer, a handheld computer, tablet computer and the like.

Computing device 800 includes one or more processor(s) 802, one or more memory device(s) 804, one or more interface(s) 806, one or more mass storage device(s) 808, one or more Input/Output (I/O) device(s) 810, and a display device 830 all of which are coupled to a bus 812. Processor(s) 802 include one or more processors or controllers that execute instructions stored in memory device(s) 804 and/or mass storage device(s) 808. Processor(s) 802 may also include various types of computer-readable media, such as cache memory.

Memory device(s) 804 include various computer-readable media, such as volatile memory (e.g., random access memory (RAM) 814) and/or nonvolatile memory (e.g., read-only memory (ROM) 816). Memory device(s) 804 may also include rewritable ROM, such as Flash memory.

Mass storage device(s) 808 include various computer readable media, such as magnetic tapes, magnetic disks, optical disks, solid-state memory (e.g., Flash memory), and so forth. As shown in FIG. 8, a particular mass storage device is a hard disk drive 824. Various drives may also be included in mass storage device(s) 808 to enable reading from and/or writing to the various computer readable media. Mass storage device(s) 808 include removable media 826 and/or non-removable media.

I/O device(s) 810 include various devices that allow data and/or other information to be input to or retrieved from computing device 800. Example I/O device(s) 810 include cursor control devices, keyboards, keypads, microphones, monitors or other display devices, speakers, printers, network interface cards, modems, and the like.

Display device 830 includes any type of device capable of displaying information to one or more users of computing device 800. Examples of display device 830 include a monitor, display terminal, video projection device, and the like.

Interface(s) 806 include various interfaces that allow computing device 800 to interact with other systems, devices, or computing environments. Example interface(s) 806 may include any number of different network interfaces 820, such as interfaces to local area networks (LANs), wide area networks (WANs), wireless networks, and the Internet. Other interface(s) include user interface 818 and peripheral device interface 822. The interface(s) 806 may also include one or more user interface elements 818. The interface(s) 806 may also include one or more peripheral interfaces such as interfaces for printers, pointing devices (mice, track pad, or any suitable user interface now known to those of ordinary skill in the field, or later discovered), keyboards, and the like.

Bus 812 allows processor(s) 802, memory device(s) 804, interface(s) 806, mass storage device(s) 808, and I/O device(s) 810 to communicate with one another, as well as other devices or components coupled to bus 812. Bus 812 represents one or more of several types of bus structures, such as a system bus, PCI bus, IEEE bus, USB bus, and so forth.

For purposes of illustration, programs and other executable program components are shown herein as discrete blocks, although it is understood that such programs and components may reside at various times in different storage components of computing device 800, and are executed by processor(s) 802. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

EXAMPLES

The following examples pertain to further embodiments.

Example 1 is a computer implemented method that includes detecting an active turn signal indicator on a target vehicle. The method includes receiving a wireless communication indicating an intended turning maneuver of the target vehicle. The method includes determining a maneuver for the parent vehicle or a timing for the maneuver based at least in-part on the intended turning maneuver.

In Example 2, the method of Example 1 further includes determining a likelihood that a driving path of the target vehicle will cross or pass within a predefined distance of a driving path of the parent vehicle.

In Example 3, the method of Example 2 further includes requesting the intended turning maneuver from the target vehicle in response to determining that the driving path of the target vehicle will cross or pass within a predefined distance of a driving path of the parent vehicle. The receiving of the wireless communication indicating the intended turning maneuver includes receiving in response to requesting the intended turning maneuver.

In Example 4, the requesting the intended turning maneuver from the target vehicle of Example 3 includes sending a V2V communication to the target vehicle.

In Example 5, the detecting the active turn signal indicator as in any of Examples 1-4 includes detecting the active turn signal based on an image or a series of images of the target vehicle.

In Example 6, the method as in any of Examples 1-5 further includes providing an indication of the intended turning maneuver to a human driver or to a driving system of the parent vehicle.

In Example 7, the indication of the intended turning maneuver as in any of Examples 1-6 includes an indication of one or more of an intersection, a roadway, driveway, or parking lot from a navigation system of the target vehicle.

In Example 8, the indication of the intended turning maneuver as in any of Examples 1-7 includes an indication of an intended U-turn maneuver.

In Example 9, the indication of the intended turning maneuver as in any of Examples 1-8 includes an indication of an intended traffic circle exit.

Example 10 is computer readable storage media storing instructions that, when executed by one or more processors, cause the one or more processors to implement a method as in any of Examples 1-9.

Example 11 is a system or device that includes means for implementing a method or realizing a system or apparatus in any of Examples 1-10.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium, which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. The terms "modules" and "components" are used in the names of certain components to reflect their implementation independence in software, hardware, circuitry, sensors, or the like. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A computer implemented method comprising:
    detecting an active turn signal indicator on a target vehicle;
    determining whether a collision is possible between a parent vehicle and the target vehicle;
    in response to determining that a collision is possible, sending a vehicle-to-vehicle probe request to the target vehicle to determine an intended turning maneuver of the target vehicle;
    receiving a wireless communication from the target vehicle indicating the intended turning maneuver of the target vehicle; and
    determining a maneuver for the parent vehicle or a timing for the maneuver based at least in-part on the intended turning maneuver.

2. The method of claim 1, wherein the determining whether a collision is possible comprises determining a likelihood that a driving path of the target vehicle will cross or pass within a predefined distance of a driving path of the parent vehicle.

3. The method of claim 1, wherein the active turn signal indicator on the target vehicle is a left turn signal, and wherein the vehicle-to-vehicle probe request seeks an indication whether the target vehicle intends to perform a left turn or a U-turn.

4. The method of claim 3, wherein, in response to the intended turning maneuver being a U-turn, the maneuver for the parent vehicle comprises one or more of decreasing speed of the parent vehicle or providing space for the target vehicle to complete the U-turn.

5. The method of claim 1, wherein detecting the active turn signal indicator comprises detecting the active turn signal based on an image or a series of images of the target vehicle.

6. The method of claim 1, further comprising providing an indication of the intended turning maneuver to a human driver or to a driving system of the parent vehicle.

7. The method of claim 1, wherein the indication of the intended turning maneuver comprises an indication of one or more of an intersection, a roadway, driveway, or parking lot from a navigation system of the target vehicle.

8. The method of claim 1, wherein determining whether a collision is possible comprises determining based on the active turn signal indicator on the target vehicle and an active turn signal indicator on the parent vehicle.

9. The method of claim 1, wherein the indication of the intended turning maneuver comprises an indication of an intended traffic circle exit.

10. A system comprising:
    a turn signal status component configured to detect an active turn signal indicator on a target vehicle;
    a path component configured to determine whether a collision is possible between a parent vehicle and the target vehicle;
    a communication component configured to:
        in response to the path component determining that a collision is possible, send a vehicle-to-vehicle probe request to the target vehicle to determine an intended turning maneuver of the target vehicle; and
        receive a wireless communication from the target vehicle indicating the intended turning maneuver of the target vehicle; and
    a maneuver component configured to determine a maneuver for the parent vehicle or a timing for the maneuver based at least in-part on the intended turning maneuver.

11. The system of claim 10, wherein the path component is configured to determine whether a collision is possible by determining a likelihood that a driving path of the target vehicle will cross or pass within a predefined distance of a driving path of the parent vehicle.

12. The system of claim 10, wherein the active turn signal indicator on the target vehicle is a left turn signal, and wherein the vehicle-to-vehicle probe request seeks an indication whether the target vehicle intends to perform a left turn or a U-turn.

13. The system of claim 12, wherein, in response to the intended turning maneuver being a U-turn, the maneuver for the parent vehicle comprises one or more of decreasing speed of the parent vehicle or providing space for the target vehicle to complete the U-turn.

14. The system of claim 10, wherein the turn signal status component detects the active turn signal indicator based on an image or a series of images of the target vehicle.

15. The system of claim 10, further comprising a notification component configured to provide an indication of the intended turning maneuver to a human driver or to a driving system of the parent vehicle.

16. The system of claim 10, wherein the indication of the intended turning maneuver comprises one or more of:
    an indication of a location of one or more of an intersection, a roadway, driveway, or parking lot from a navigation system of the target vehicle;
    an indication of an intended U-turn maneuver; or
    an indication of an intended traffic circle exit location.

17. Non-transitory computer readable storage media storing instructions that, when executed by one or more processors, cause the one or more processors to:
    determine that a turn signal indicator of a parent vehicle is active;
    detect an active turn signal indicator on a target vehicle;
    determine, based on an active route of a navigation system of the parent vehicle, an intended turning maneuver of the parent vehicle;
    determine, based on the active turn signal indicator on the target vehicle and the intended turning maneuver of the parent vehicle, whether a collision is possible between the parent vehicle and the target vehicle;

in response to determining that a collision is possible, send a vehicle-to-vehicle probe request to the target vehicle to determine an intended turning maneuver of the target vehicle; and transmit a message indicating the intended turning maneuver of the parent vehicle for receipt by proximal vehicles in response to the turn signal indicator of the parent vehicle being active.

18. The computer readable storage media of claim 17, wherein the instructions cause the one or more processors to receive and process a signal from the target vehicle requesting the intended turning maneuver of the target vehicle, wherein transmitting the message indicating the intended turning maneuver of the parent vehicle comprises transmitting in response to receiving the signal from the target vehicle requesting the intended turning maneuver of the target vehicle.

19. The computer readable storage media of claim 17, wherein the instructions further cause the one or more processors to determine a driving maneuver for the parent vehicle based at least in part on the signal from the target vehicle requesting the intended turning maneuver of the target vehicle.

20. The computer readable storage media of claim 17, wherein the instructions cause the one or more processors to transmit the message indicating the intended turning maneuver of the parent vehicle, the message comprising one or more of:

an indication of one or more of an intersection, a roadway, driveway, or parking lot in the active route of the navigation system;

an indication of an intended U-turn maneuver; or an indication of an intended traffic circle exit.

* * * * *